United States Patent [19] [11] 3,849,108
Fields [45] Nov. 19, 1974

[54] METHOD OF RETARDING THE REGROWTH ON TREES

[75] Inventor: Richard W. Fields, Geneva, Ill.

[73] Assignee: Velsicol Chemical Corporation, Chicago, Ill.

[22] Filed: May 5, 1972

[21] Appl. No.: 250,555

[52] U.S. Cl............................ 71/88, 71/78, 71/76, 71/115
[51] Int. Cl.............................................. A01n 9/00
[58] Field of Search .................. 71/107, 88, 76, 115

[56] References Cited
UNITED STATES PATENTS
3,297,427  1/1967  Richter ................................. 71/107
3,444,192  5/1969  Newcomer ........................... 71/107
3,671,215  1/1972  Bellsmith et al. ....................... 71/97

*Primary Examiner*—James O. Thomas, Jr.
*Attorney, Agent, or Firm*—Robert J. Schwarz; Dietmar H. Olesch

[57] ABSTRACT

This invention discloses a method of retarding the regrowth of shoots in the vicinity of cut branches on trees which comprises applying to the cut surface of said tree a solution containing from about 0.005 to about 0.5 weight percent of a compound selected from the group consisting of sodium 2-methoxy-3,6-dichlorobenzoate, potassium 2-methoxy-3,6-dichlorobenzoate, furfuryl 2-methoxy-3,6-dichlorobenzoate, 2-methoxy-3,6-dichlorobenzoic acid and an amine salt of 2-methoxy-3,6-dichlorobenzoic acid.

10 Claims, No Drawings

METHOD OF RETARDING THE REGROWTH ON TREES

This invention relates to a method of retarding or preventing the regrowth of shoots in the vicinity of cut branches on trees by applying to the surface of the cut a growth inhibiting composition shortly after trimming of the branches.

Trees frequently require trimming of their branches when they get into the way of power lines, buildings or other structures. It is found that shortly after the cutting of branches numerous new shoots appear in the vicinity of the cut. These shoots grow at a much faster rate than ordinary branches often attaining a length of ten to twenty inches in a month. This regrowth not only results in a recurrence of the obstruction sought to be prevented but is also unsightly and unappealing.

It has now been found that the regrowth of shoots in the vicinity of cut branches on trees can be substantially retarded or totally prevented by applying a solution of 2-methoxy-3,6-dichlorobenzoic acid or certain salts or esters thereof to the cut. More specifically it has been found that a compound selected from the group consisting of 2-methoxy-3,6-dichlorobenzoic acid, sodium 2-methoxy-3,6-dichlorobenzoate, potassium 2-methoxy-3,6-dichlorobenzoate, furfuryl 2-methoxy-3,6-dichlorobenzoate and amine salts of 2-methoxy-3,6-dichlorobenzoic acid are especially useful for this purpose.

Thus, one embodiment of the present invention resides in a method of retarding the regrowth of shoots in the vicinity of cut branches on trees which comprises applying to the cut surface of said tree a solution containing from about 0.005 to about 0.5 weight percent of a compound selected from the group consisting of 2-methoxy-3,6-dichlorobenzoic acid, sodium 2-methoxy-3,6-dichlorobenzoate, potassium 2-methoxy-3,6-dichlorobenzoate, furfuryl 2-methoxy-3,6-dichlorobenzoate and amine salts of 2-methoxy-3,6-dichlorobenzoic acid.

Exemplary useful amine salts of 2-methoxy-3,6-dichlorobenzoic acid are the methylamine salt, the ethylamine salt, the propylamine salt, the butylamine salt, the dimethylamine salt, the diethylamine salt, the dipropylamine salt, the methyl ethylamine salt, the methanolamine salt, the ethanolamine salt, the dimethanolamine salt, the diethanolamine salt and the like.

The active compounds of the present invention as such and the method of their preparation are known in the art. The compounds of this invention are used in the form of a solution for application to the site of the branch cut. While organic solvents such as ethanol, isopropanol and dimethylformamide can be used to prepare these solutions the preferred solvent is water.

The concentration of the active compound in the solution can range from about 0.005 to about 0.5 percent by weight depending upon such factors as the species of trees being treated, the number of applications, the time of application and the like. In a preferred embodiment of this invention the concentration of active compound in the solution ranges from about 0.01 to about 0.2 percent by weight.

The regrowth inhibiting compositions of this invention are applied to the surface of the cut where regrowth is sought to be prevented. This application can be effected in any convenient manner such as brushing the solution onto the cut thereby causing penetration of the active compound into the tree. Spraying of the solution can also be utilized but care must be exercised to prevent application to other parts of the tree to prevent destruction of desirable portions of the tree.

A particularly desirable formulation of the regrowth inhibiting compounds of this invention comprises a tree wound dressing in combination with a compound of this invention. Typically such wound dressings are aqueous emulsions of asphalt, coal tar or other resinous material which upon application to a cut, seal off the surface of the cut thereby preventing infection of this area by disease organisms as well as insects.

It is desirable to formulate the wound dressing containing the regrowth inhibiting compound as an aqueous aerosol to provide a convenient means of application. The aqueous aerosol can be prepared from an emulsion of a binder, such as asphalt, rosin-oil mixtures, synthetic resin and the like, wherein water is the continuous phase, by mixing with a solution of the growth inhibiting compound of this invention and thereafter combining said mixture with a propellant. The total composition can comprise from about 10 to about 50 weight percent binder, from about 10 to about 70 weight percent water, from about 0.005 to about 0.5 weight percent of the growth inhibiting compound of this invention and from about 20 to about 80 weight percent propellant.

The preparation of the above-described composition can be effected by first preparing the aqueous emulsion of the binder in accordance with standard techniques in the art, thereafter adding an aqueous solution of the growth inhibiting compound to the emulsion, charging the resulting mixture into a suitable aerosol pressure container and adding the propellant thereto. The particular propellant used is not critical and any of the standard propellants such as the freons or hydrocarbon propellants are suitable.

The following examples illustrate some of the aerosol compositions useful in accordance with the present invention. In each example the numerical values represent weight percent of the total composition.

Example 1

| | |
|---|---|
| Asphalt | 25 |
| Water | 22.9 |
| Emulsifier (Emcol 14; a polyglycol ester of a fatty acid) | 2 |
| Dimethylamine salt of 2-methoxy-3,6-dichlorobenzoic acid | 0.1 |
| Freon-12 | 50 |

Example 2

| | |
|---|---|
| Wood Rosin | 5 |
| Fish Oil | 5 |
| Water | 10 |
| Emulsifier (Emcol 14) | 0.8 |
| Sodium 2-methoxy-3,6-dichlorobenzoate | 0.01 |
| Freon-12 | 79.19 |

Example 3

| | |
|---|---|
| Asphalt | 50 |
| Water | 27 |
| Emulsifier (Emcol 14) | 2.9 |
| Potassium 2-methoxy-3,6-dichlorobenzoate | 0.1 |
| Freon-12 | 20 |

Example 4

| | |
|---|---|
| Asphalt | 30 |
| Water | 30 |
| Emulsifier | 2.5 |
| Furfuryl 2-methoxy-3,6-dichloro- | |
| benzoate | 0.1 |
| Freon-12 | 37.4 |

Example 5

| | |
|---|---|
| Asphalt | 30 |
| Isopropanol | 5 |
| Dimethylformamide | 5 |
| Kerosene | 59.9 |
| 2-Methoxy-3,6-dichloro- | |
| benzoic acid | 0.1 |

The effectiveness of the compounds of this invention in controlling the regrowth of shoots in the vicinity of cut branches on trees was demonstrated in experiments wherein several compounds formulated as aqueous solutions were applied by brushing the solution onto cuts on various trees. The results determined on the designated trees were as follows:

HUIASCHE - The dimethylamine salt of 2-methoxy-3,6-dichlorobenzoic acid applied at a concentration of 0.1% by weight resulted in no regrowth. At 0.01% and 0.05% new shoots having a length of 2 to 4 inches appeared. Control trees had shoots of 8 to 10 inches in length.

HACKBERRY - The dimethylamine salt of 2-methoxy-3,6-dichlorobenzoic acid applied at a concentration of 0.1% by weight resulted in a regrowth of very few shoots, these having a length of 0.5 to 1 inches. At 0.01 and 0.05% new shoots having a length of 2 to 4 inches appeared. Control trees had many new shoots of an average length of 12 to 16 inches.

BRAZILIAN PEPPER - The compound furfuryl 2-methoxy-3,6-dichlorobenzoate totally inhibited regrowth at all concentrations of 0.01, 0.05 and 0.1% by weight. Control trees had new shoots of 6 to 8 inches long.

OLEANDER - Both the dimethylamine salt of 2-methoxy-3,6-dichlorobenzoic acid and furfuryl 2-methoxy-3,6-dichlorobenzoate applied at a concentration of 0.1% by weight resulted in a regrowth of 2 or 3 sprouts 1 to 2 inches long. Control trees showed a regrowth of 5 to 6 sprouts being 4 to 5 inches long.

I claim:

1. A method of retarding the regrowth of shoots in the vicinity of cut branches on trees which comprises applying to the cut surface of said tree a solution containing from about 0.005 to about 0.5 weight percent of a compound selected from the group consisting of 2-methoxy-3,6-dichlorobenzoic acid, sodium 2-methoxy-3,6-dichlorobenzoate, potassium 2-methoxy-3,6-dichlorobenzoate, furfuryl 2-methoxy-3,6-dichlorobenzoate and amine salts of 2-methoxy-3,6-dichlorobenzoic acid.

2. The method of claim 1 wherein the solution is an aqueous solution.

3. The method of claim 1 wherein the compound is 2-methoxy-3,6-dichlorobenzoic acid.

4. The method of claim 1 wherein the compound is sodium 2-methoxy-3,6-dichlorobenzoate.

5. The method of claim 1 wherein the compound is potassium 2-methoxy-3,6-dichlorobenzoate.

6. The method of claim 1 wherein the compound is furfuryl 2-methoxy-3,6-dichlorobenzoate.

7. The method of claim 1 wherein the compound is the dimethylamine salt of 2-methoxy-3,6-dichlorobenzoic acid.

8. A method of retarding the regrowth of shoots in the vicinity of cut branches on trees which comprises applying to the cut surface of said tree a composition comprising a tree wound dressing and from about 0.005 to about 0.5 weight percent based on the total composition a compound selected from the group consisting of 2-methoxy-3,6-dichlorobenzoic acid, sodium 2-methoxy-3,6-dichlorobenzoate, potassium 2-methoxy-3,6-dichlorobenzoate, furfuryl 2-methoxy-3,6-dichlorobenzoate and amine salts of 2-methoxy-3,6-dichlorobenzoic acid.

9. The method of claim 7 wherein said composition is an aqueous aerosol comprising from about 10 to about 50 weight percent binder, from about 10 to about 70 weight percent water, from about 0.005 to about 0.5 weight percent of a compound selected from the group consisting of 2-methoxy-3,6-dichlorobenzoic acid, sodium 2-methoxy-3,6-dichlorobenzoate, potassium 2-methoxy-3,6-dichlorobenzoate, furfuryl 2-methoxy-3,6-dichlorobenzoate and amine salts of 2-methoxy-3,6-dichlorobenzoic acid and from about 20 to about 80 weight percent propellant.

10. The method of claim 8 wherein the binder is asphalt.

* * * * *